United States Patent
Gamache

(10) Patent No.: US 11,213,786 B2
(45) Date of Patent: Jan. 4, 2022

(54) METHODS AND SYSTEMS FOR MANAGING GAS PURIFICATION

(71) Applicant: MÉCANIQUE ANALYTIQUE INC., Québec (CA)

(72) Inventor: Yves Gamache, Adstock (CA)

(73) Assignee: MÉCANIQUE ANALYTIQUE INC., Québec (CA)

( * ) Notice: Subject to any disclaimer, the term of this patent is extended or adjusted under 35 U.S.C. 154(b) by 729 days.

(21) Appl. No.: 15/555,193

(22) PCT Filed: Mar. 4, 2016

(86) PCT No.: PCT/CA2016/050231
§ 371 (c)(1),
(2) Date: Sep. 1, 2017

(87) PCT Pub. No.: WO2016/141465
PCT Pub. Date: Sep. 15, 2016

(65) Prior Publication Data
US 2018/0050301 A1     Feb. 22, 2018

Related U.S. Application Data

(60) Provisional application No. 62/129,194, filed on Mar. 6, 2015.

(51) Int. Cl.
*B01D 53/34* (2006.01)
*B01D 53/30* (2006.01)
(Continued)

(52) U.S. Cl.
CPC ....... *B01D 53/346* (2013.01); *B01D 53/0407* (2013.01); *B01D 53/0454* (2013.01);
(Continued)

(58) Field of Classification Search
CPC ........ B01D 2251/102; B01D 2253/102; B01D 2253/108; B01D 2253/116;
(Continued)

(56) References Cited

U.S. PATENT DOCUMENTS

| 5,168,323 A | 12/1992 | Purtschert et al. |
| 5,360,467 A * | 11/1994 | Ketkar .................... G01N 30/00 95/115 |
| 5,993,612 A * | 11/1999 | Rostaing .............. B01D 53/323 204/158.2 |

FOREIGN PATENT DOCUMENTS

CA     2783138 A1     6/2011

OTHER PUBLICATIONS

International Search Report dated Mar. 31, 2016, from International Application No. PCT/CA2016/050231, 2 pages.
(Continued)

*Primary Examiner* — Anthony J Zimmer
*Assistant Examiner* — Syed T Iqbal
(74) *Attorney, Agent, or Firm* — Meunier Carlin & Curfman LLC

(57) ABSTRACT

A method for extending useful life of a sorbent for purifying a gas by sorption of an impurity is provided. The method generating a electrical discharge within the gas to obtain a spectral emission representative of a concentration of the impurity. The method also includes monitoring the concentration of the impurity according to the spectral emission. The method also includes lowering the concentration of the impurity by conversion of at least a portion of the impurity into a secondary impurity having a greater affinity to the sorbent than the impurity. The method also includes comparing the concentration of the impurity to a polluting concentration and managing the sorption of the gas onto the sorbent according to the comparison.

17 Claims, 7 Drawing Sheets

(51) Int. Cl.
  B01J 20/02    (2006.01)
  B01J 20/34    (2006.01)
  B01D 53/04    (2006.01)
  B01D 53/32    (2006.01)
  B01J 20/18    (2006.01)
  B01D 53/86    (2006.01)
  C01B 23/00    (2006.01)
  B01J 20/20    (2006.01)

(52) U.S. Cl.
  CPC .......... *B01D 53/30* (2013.01); *B01D 53/32* (2013.01); *B01D 53/323* (2013.01); *B01D 53/8696* (2013.01); *B01J 20/02* (2013.01); *B01J 20/18* (2013.01); *B01J 20/20* (2013.01); *B01J 20/3408* (2013.01); *B01J 20/3416* (2013.01); *B01J 20/3433* (2013.01); *B01J 20/3441* (2013.01); *C01B 23/0015* (2013.01); *C01B 23/0073* (2013.01); *C01B 23/0094* (2013.01); *B01D 53/0423* (2013.01); *B01D 2251/102* (2013.01); *B01D 2253/102* (2013.01); *B01D 2253/108* (2013.01); *B01D 2253/116* (2013.01); *B01D 2255/20707* (2013.01); *B01D 2255/20715* (2013.01); *B01D 2255/20723* (2013.01); *B01D 2255/20738* (2013.01); *B01D 2256/10* (2013.01); *B01D 2256/18* (2013.01); *B01D 2257/102* (2013.01); *B01D 2257/108* (2013.01); *B01D 2257/502* (2013.01); *B01D 2257/504* (2013.01); *B01D 2257/702* (2013.01); *B01D 2257/7025* (2013.01); *B01D 2257/80* (2013.01); *B01D 2259/818* (2013.01); *C01B 2210/005* (2013.01); *C01B 2210/007* (2013.01); *C01B 2210/0029* (2013.01); *C01B 2210/0046* (2013.01); *C01B 2210/0051* (2013.01); *C01B 2210/0053* (2013.01); *C01B 2210/0062* (2013.01); *Y02C 20/20* (2013.01); *Y02C 20/40* (2020.08); *Y02P 20/151* (2015.11); *Y02P 20/156* (2015.11)

(58) Field of Classification Search
  CPC .......... B01D 2255/20707; B01D 2255/20715; B01D 2255/20723; B01D 2255/20738; B01D 2256/10; B01D 2256/18; B01D 2257/102; B01D 2257/108; B01D 2257/502; B01D 2257/504; B01D 2257/702; B01D 2257/7025; B01D 2257/80; B01D 2259/818; B01D 53/0407; B01D 53/0423; B01D 53/0454; B01D 53/30; B01D 53/32; B01D 53/323; B01D 53/346; B01D 53/8696; B01J 20/02; B01J 20/18; B01J 20/20; B01J 20/3408; B01J 20/3416; B01J 20/3433; B01J 20/3441; C01B 2210/0029; C01B 2210/0046; C01B 2210/005; C01B 2210/0051; C01B 2210/0053; C01B 2210/0062; C01B 2210/007; C01B 23/0015; C01B 23/0073; C01B 23/0094; Y02C 10/08; Y02C 20/20; Y02P 20/152; Y02P 20/156
  See application file for complete search history.

(56) References Cited

OTHER PUBLICATIONS

Written Opinion dated Mar. 30, 2016, from International Application No. PCT/CA2016/050231, 8 pages.

* cited by examiner

METHODS AND SYSTEMS FOR MANAGING GAS PURIFICATION

FIELD

The field generally relates to gas purification by surface sorption, and more particularly relates to methods and systems making use of spectroscopic emission for managing gas purification.

BACKGROUND

Removal of impurities from a gas may be performed by sorption on an active surface of a catalytic sorbent, such as a non-evaporable gettering alloy. For example, it is known to purify noble gases such as argon, helium, neon, krypton, or xenon by passing them through a heated zirconium-based sorbent, e.g. a zirconium alloy. The zirconium alloy can be provided in powder or pellet format, and contained in a stainless steel vessel, which is thermally insulated and can be heated. The zirconium alloy acts as a gettering alloy for removing impurities such as $H_2O$, $N_2$, $CH_4$, $CO$, $CO_2$, $H_2$ and NMHC (Non Methane Hydrocarbons) from the gas.

Like most sorbents, a gettering alloy does not maintain its sorption activity for an indefinite period as the alloy undergoes deactivation. Deactivation of a sorbent may be caused for example by aging, i.e. change in surface crystal structure; by poisoning, i.e. irreversible deposition of a substance on an active site of the alloy; or by fouling, i.e. deposit of carbonaceous material on the sorbent surface. Of all the above impurities, $N_2$ and $CH_4$ are generally the first ones to be unadsorbed by a gettering alloy once the latter has reached the end of its useful lifetime.

Typically, a user is only informed about the end of the life of a sorbent when downstream analytical systems become polluted, resulting in a shut-down of the gas purification operations. In addition, pollution of the sorbent by introduction of excessive concentrations of impurities may generate exothermic reactions damaging the sorbent, for example by moltening an alloy, thereby creating fire hazard and risks of injuries in the working environment.

Knowledge of the impurities concentrations throughout the sorption process can be challenging. Therefore, there is still a need for methods and systems enabling better management of impurities concentrations.

SUMMARY

Methods and systems related to gas purification by surface sorption are provided. The methods and systems of the present description make use of spectral emissions following an electrical discharge (or plasma discharge) within the gas, upstream and/or downstream of the sorption step.

In one aspect, a method for extending useful life of a sorbent is provided. The sorbent is for purifying a gas by sorption of an impurity. The method includes:
generating an electrical discharge within the gas to obtain a spectral emission representative of a concentration of the impurity $C_i$;
monitoring the concentration of the impurity $C_i$ according to the spectral emission;
lowering the concentration of the impurity $C_i$ by conversion of at least a portion of the impurity into a secondary impurity having a greater affinity to the sorbent than the impurity; and
comparing $C_i$ to a polluting concentration $C_p$, comprising:

when $C_i < C_p$: allowing the sorption of the impurity onto the sorbent, to obtain a purified gas; and
when $C_i \geq C_p$: preventing the sorption of the impurity onto the sorbent.

In some implementations, allowing the sorption of the impurity onto the sorbent includes contacting the gas with the sorbent; and preventing the sorption of the impurity onto the sorbent comprises preventing the gas from contacting the sorbent.

In some implementations, allowing the sorption of the impurity onto the sorbent comprises powering-up the sorbent; and preventing the sorption of the impurity onto the sorbent comprises shutting down power supplied to the sorbent.

In some implementations, if $C_i \geq C_p$: the method further includes further lowering the concentration of the impurity $C_i$.

In some implementations, the method further includes adding a doping agent to the gas, the conversion of the impurity being performed by a reaction of the impurity with the doping agent, the reaction being triggered by the electrical discharge.

In some implementations, the doping agent comprises at least one of water and $O_2$.

In some implementations, the doping agent comprises water.

In some implementations, the doping agent is added at a concentration between 10 ppm and 200 ppm.

In some implementations, the method further includes removing the doping agent from the gas prior to contacting the gas with the sorbent.

In some implementations, the method further includes:
monitoring a temperature of the sorbent $T_s$; and
comparing $T_s$ to a critical temperature $T_c$, and preventing the sorption of the impurity onto the sorbent when $T_s \geq T_c$.

In some implementations, the method further includes:
monitoring a temperature of the sorbent $T_s$; and
comparing $T_s$ to a critical temperature $T_c$, comprising:
when $T_s < T_c$: allowing the sorption of the impurity onto the sorbent; and
when $T_s \geq T_c$: preventing the sorption of the impurity onto the sorbent.

In some implementations, the method further includes:
generating an electrical discharge within the purified gas to obtain a second spectral emission representative of a residual concentration of the impurity $C_f$ in the purified gas;
monitoring the residual concentration of the impurity $C_f$ according to the second spectral emission; and
comparing $C_f$ to a reference concentration $C_{Ref}$, and preventing the sorption of the impurity onto the sorbent and/or sending a warning signal to a user when $C_f \geq C_{Ref}$.

In some implementations, the gas comprises a noble gas.
In some implementations, the noble gas comprises helium, argon, neon, krypton, xenon or a mixture thereof.

In some implementations, the sorbent comprises at least one of a gettering alloy, a molecular sieve, a catalytic sorbent and activated carbon.

In some implementations, the sorbent comprises a gettering alloy.

In some implementations, the gettering alloy is zirconium-based.

In some implementations, the impurity comprises at least one of $H_2O$, $N_2$, $CH_4$, $CO$, $CO_2$, $H_2$ and a non-methane hydrocarbon (NHMC).

In some implementations, the electrical discharge comprises at least one of a dielectric barrier discharge, a pulse discharge, a DC voltage discharge and a corona type discharge.

In some implementations, the electrical discharge is multi-staged.

In another aspect, a method for purifying a gas by sorption of an impurity onto a sorbent is provided. The method includes:
    generating an electrical discharge within the gas to obtain a spectral emission representative of a concentration of the impurity $C_i$;
    monitoring the concentration of the impurity $C_i$ according to the spectral emission;
    lowering the concentration of the impurity $C_i$ to below a polluting concentration $C_p$, by conversion of at least a portion of the impurity into a secondary impurity having a greater affinity to the sorbent than the impurity, to obtain a pre-treated gas; and
    contacting the pre-treated gas with the sorbent for sorption of the impurity onto the sorbent.

In some implementations, the method further includes adding a doping agent to the gas, the conversion of the impurity being performed by a reaction of the impurity with the doping agent, the reaction being triggered by the electrical discharge.

In some implementations, the doping agent comprises at least one of water and $O_2$.

In some implementations, the doping agent comprises water.

In some implementations, the doping agent is added at a concentration between 10 ppm and 200 ppm.

In some implementations, the method further includes removing the doping agent from the gas prior to contacting the pre-treated gas with the sorbent.

In some implementations, the gas comprises a noble gas.

In some implementations, the noble gas comprises helium, argon, neon, krypton, xenon or a mixture thereof.

In some implementations, the sorbent comprises at least one of a gettering alloy, a molecular sieve, a catalytic sorbent and activated carbon.

In some implementations, the sorbent comprises a gettering alloy.

In some implementations, the gettering alloy is zirconium-based.

In some implementations, the impurity comprises at least one of $H_2O$, $N_2$, $CH_4$, CO, $CO_2$, $H_2$ and non-methane hydrocarbons (NHMC).

In some implementations, the electrical discharge comprises at least one of a dielectric barrier discharge, a pulse discharge, a DC voltage discharge and a corona type discharge.

In some implementations, the electrical discharge is multi-staged.

In some implementations, substantially all of the impurity is converted into the secondary impurity.

In some implementations, the method further includes contacting the gas with a preliminary sorbent prior to contacting the pre-treated gas with the sorbent.

In some implementations, the preliminary sorbent comprises at least one of a preliminary gettering alloy, a molecular sieve, a catalytic sorbent and activated carbon.

In some implementations, the preliminary sorbent comprises a preliminary gettering alloy.

In some implementations, the preliminary gettering alloy is nickel-based.

In yet another aspect, a system for purifying a gas by sorption of an impurity onto a sorbent is provided. The system includes:
    an electrical discharge reactor for generating an electrical discharge within the gas and obtaining a spectral emission representative of a concentration of the impurity $C_i$;
    a monitoring unit operatively connected to the electrical discharge reactor, for monitoring the concentration of the impurity $C_i$ according to the spectral emission;
    a reaction chamber in fluid communication with the electrical discharge reactor, for lowering the concentration of the impurity $C_i$ by conversion of at least a portion of the impurity into a secondary impurity having a greater affinity to the sorbent than the impurity;
    a purification unit comprising the sorbent, configurable to receive the gas from the reaction chamber and purify the gas by sorption to obtain a purified gas; and
    a control unit operatively connected to the monitoring unit and the purification unit, the control unit being configured to compare $C_i$ to a polluting concentration $C_p$, wherein:
        the control unit enables sorption of the gas onto the sorbent when $C_i<C_p$; and
        the control unit prevents sorption of the gas onto the sorbent when $C_i \geq C_p$.

In some implementations, the control unit is further configured to compare a temperature of the sorbent $T_s$ to a critical temperature $T_c$, wherein the control unit prevents sorption of the gas onto the sorbent when $T_s \geq T_c$.

In some implementations, the control unit is further configured to compare a temperature of the sorbent $T_s$ to a critical temperature $T_c$, wherein:
    the control unit enables sorption of the gas onto the sorbent when $T_s<T_a$; and
    the control unit prevents sorption of the gas onto the sorbent when $T_s \geq T_c$.

In some implementations, the system further includes a flow control device between the reaction chamber and the purification unit, the flow control device being operatively connected to the control unit, wherein:
    the control unit enables sorption of the gas onto the sorbent by directing the flow control device to enable fluid communication between the electrical discharge reactor and the purification unit; and
    the control unit prevents sorption of the gas onto the sorbent by directing the flow control device to prevent fluid communication between the electrical discharge reactor and the purification unit.

In some implementations, the flow control device is configured to reroute the gas to upstream of the electrical discharge reactor when fluid communication between the electrical discharge reactor and the purification unit is prevented.

In some implementations, the flow control device comprises a 3-way valve.

In some implementations, the control unit enables sorption of the gas onto the sorbent by allowing the purification unit to be powered up; and the control unit prevents sorption of the gas onto the sorbent by shutting down power supplied to the purification unit.

In some implementations, the system further includes a doping agent dispenser upstream of the electrical discharge reactor for adding a doping agent to the gas, the conversion of the impurity being performed by a reaction of the impurity with the doping agent, wherein the reaction chamber is part of the electrical discharge reactor and the reaction is triggered by the electrical discharge.

In some implementations, the doping agent comprises at least one of water and $O_2$.

In some implementations, the doping agent comprises water.

In some implementations, the doping agent is added at a concentration between 10 ppm and 200 ppm.

In some implementations, the system further includes a trap downstream of the reaction chamber, for removing the doping agent from the gas prior to contacting the sorbent.

In some implementations, the system further includes:
a second electrical discharge reactor downstream of the purification unit, for generating an electrical discharge within the purified gas and obtaining a second spectral emission representative of a final concentration of the impurity $C_f$ in the purified gas; and
a second monitoring unit for monitoring the final concentration of the impurity $C_f$ according to the second spectral emission, the second monitoring unit being operatively connected to the second electrical discharge reactor and to the control unit,
wherein the control unit is configured to compare $C_f$ to a reference concentration $C_{Ref}$, and to prevent sorption of the gas onto the sorbent when $C_f \geq C_{Ref}$.

In some implementations, the gas comprises a noble gas.

In some implementations, the noble gas comprises helium, argon, neon, krypton, xenon or a mixture thereof.

In some implementations, the sorbent comprises at least one of a gettering alloy, a molecular sieve, a catalytic sorbent and activated carbon.

In some implementations, the sorbent comprises a gettering alloy.

In some implementations, the gettering alloy is zirconium-based.

In some implementations, the impurity comprises at least one of $H_2O$, $N_2$, $CH_4$, $CO$, $CO_2$, $H_2$ and a non-methane hydrocarbon (NHMC).

In some implementations, the electrical discharge reactor comprises at least one of a dielectric barrier discharge reactor, a pulse discharge reactor, a DC voltage discharge reactor and a corona type discharge reactor.

In some implementations, the electrical discharge reactor is a multi-staged electrical discharge reactor.

In one aspect, there is provided a method for identifying polluting concentrations of impurities in a gas before purification of said gas on a sorbent such as a gettering alloy. Knowledge of initial concentrations of impurities in the gas, before sorption, may enable to prevent or reduce pollution of the sorbent. In some implementations, the method includes providing a gas containing an impurity having a concentration in the gas; generating an electrical discharge within the gas before contacting the sorbent, to obtain a spectral emission from the gas, which is representative of the concentration of the impurity in the gas; monitoring the spectral emission which is indicative of the concentration of the impurity; and comparing the concentration of the impurity with a known polluting concentration.

In some implementations, if the concentration of the impurity is below the polluting concentration, the method may include contacting the gas with the sorbent so as to adsorb the at least one impurity onto the sorbent and purify the gas.

In some implementations, if the concentration of the impurity is at or above the polluting concentration, the method may include preventing the gas from contacting the sorbent.

In some implementations, if the concentration is at or above the polluting concentration, the method may include further processing the gas to lower the concentration of the impurity to below the polluting concentration.

In some implementations, the gas may include a plurality of impurities, each impurity having a corresponding concentration that is monitored according to the method described herein, and a corresponding polluting concentration serving as reference.

In another aspect, there is provided a method for pre-treating a gas before purification by sorption on a sorbent. The sorption propensity (or affinity) of a given impurity onto a sorbent may depend on the nature of the impurity, therefore impacting the overall gas purification efficiency. In some implementations, the pre-treatment method includes providing a gas including an impurity having a low sorption propensity for the sorbent; and generating an electrical discharge within the gas to convert at least a portion of the impurity into at least one secondary impurity having a greater affinity to the sorbent than the impurity.

In some implementations, the method may include catalyzing conversion of the impurity into the at least one secondary impurity by use of a catalyst. In some implementations, the reaction is triggered by the electrical discharge.

In some implementations, the method may include chemically trapping the at least one secondary impurity from the gas with a chemical trap before purification of the gas by sorption on the sorbent.

In another aspect, there is provided a method for characterizing a final concentration of an impurity in a gas after purification of said gas by sorption on a sorbent. Knowledge of the final concentration of the impurity within the so called purified gas may be used to evaluate the efficiency and viability of the sorption step. For example, knowledge of the final concentration of the impurity may be used to detect the end-of-life of the sorbent. In some implementations, the method includes providing a sample of a gas having been purified by sorption on a sorbent, the sample having a final concentration of an impurity; and monitoring a spectral emission from the gas, the spectral emission being generated by electrical discharge within the gas and being representative of the final concentration of the impurity.

In some implementations, the method may include comparing the monitored final concentration to a reference concentration to evaluate the efficiency of the sorbent. It should be understood that the reference concentration of each impurity may be obtained from a reference sample of gas which is submitted to the electrical discharge, thereby generating a spectral emission which is monitored as a reference emission profile indicative of the reference concentration of each impurity.

In some implementations, the method may include comparing the monitored final concentration to a known maximum threshold of the reference concentration to evaluate the viability of the sorbent.

In another aspect, there is provided a gas purification system for enhanced sorption of impurities from a gas. The system includes at least one purification unit including a sorbent which is selected to adsorb an impurity from the gas, thereby producing a purified gas. The system can further include a pre-purification unit, a post-purification unit or a combination thereof. The pre-purification unit and the post-purification unit are configured to generate an electrical discharge within the gas flowing therethrough.

In some implementations, the pre-purification unit may include a monitoring device to monitor a spectral emission from the gas, which is representative of the concentration of an impurity, the spectral emission being generated by the electrical discharge.

In some implementations, the pre-purification unit may include a reaction chamber wherein at least a portion of the impurity is converted into a secondary impurity having a higher affinity to the sorbent, the conversion being triggered by the electrical discharge within the reaction chamber. A pre-treated gas may be therefore released from the reaction chamber.

In some implementations, the pre-purification unit may include a connective piping for installation upstream of the purification unit, the connective piping putting the reaction chamber in fluid communication with an inlet of the purification unit.

In some implementations, the pre-purification unit may include a chemical trap to trap the secondary impurity before feeding the pre-treated gas to the purifier. The chemical trap can be mounted across the connective piping.

In some implementations, the post-purification unit may include a monitoring device to monitor spectral emission from a sample of the purified gas which is indicative of a final concentration of each impurity, the spectral emission being created by the electrical discharge.

In some implementations, the post-purification unit may include a bypass piping mounted about an outlet of the purifier, the bypass piping being configured to sample the purified gas released from the purification unit.

In some implementations, the gas may include a plurality of impurities, each impurity having a corresponding concentration and a corresponding polluting concentration serving as a reference. The concentration of each impurity can be monitored by generating an electrical discharge and monitoring a spectral emission from the gas which is representative of the concentration of the impurities. It is understood that a spectral emission generated by the electrical discharge can be monitored to obtain the concentrations of several impurities.

It is understood that the present description describes example embodiments, and that it is not intended to limit the scope of the claims to such embodiments. On the contrary, it is intended to cover all alternatives, modifications and equivalents as may be included as defined in the present description. The objects, advantages and other features of the present invention will become more apparent and be better understood upon reading of the following non-restrictive description, given with reference to the accompanying drawings.

BRIEF DESCRIPTION OF THE DRAWINGS

Implementations of the methods and systems are represented in and will be further understood in connection with the following figures.

DETAILED DESCRIPTION OF EMBODIMENTS

Figure 1:
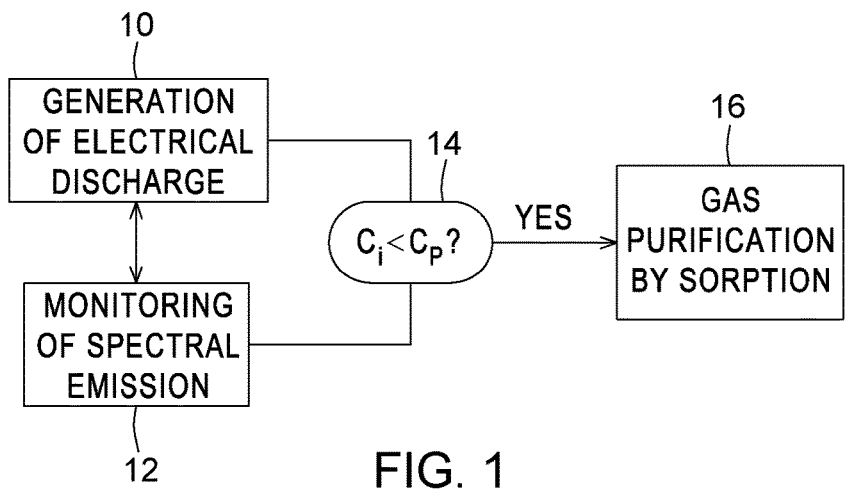
FIG. 1 is a schematic diagram of a gas purification method including monitoring of the initial concentration of at least one impurity upstream of the gas purification, according to an embodiment.

The present description provides methods and systems which can make use of a spectral emission following an electrical discharge within a gas, to monitor and/or manage the concentration of an impurity in the gas downstream of a purification unit including sorption of a gas onto a sorbent, and/or to monitor the concentration of the impurity in the gas upstream of the purification unit. The present description also provides methods and systems for extending the useful life of a sorbent.

General Definitions

It will be readily understood that the gases of interest may include noble gases. In some implementations, the gas to be purified may include argon, helium, neon, krypton, xenon or a combination thereof. However, it should be understood that the methods and systems described herein may be used for purification of any gas including gaseous impurities.

One skilled in the art would readily know that sorption encompasses the reversible and/or irreversible sorption of a gas on an active surface of a solid, also referred to herein as a sorbent. The sorption may be physical (physisorption) or chemical (chemisorption). The sorbent can include a gettering alloy (or getter alloy) which is selected to getter or trap gaseous impurities including $H_2O$, $N_2$, $CH_4$, CO, $CO_2$, $H_2$ and/or non-methane hydrocarbons (NMHC). Is should be understood that other gaseous impurities can be sorbed depending on the sorbent used. It should also be understood that the sorbent can include a gettering alloy based on zirconium, vanadium, titanium, aluminum, nickel, copper, iron or a combination thereof. For example, the gettering alloy may be composed of 75% zirconium, 20% vanadium and 5% iron. Alternatively, the gettering alloy may be composed of 75% zirconium and 25% iron, particularly suited for nitrogen purification. It should also be understood that the sorbent is not limited to a gettering alloy and may include other types of sorbents such as a molecular sieve, a catalytic sorbent, or activated carbon.

Impurities can be eliminated from the gas by sorption onto the sorbent. The sorption propensity (or affinity) of an impurity with regard to the sorbent may depend on the nature of the impurity contained in the gas, and can impact the overall gas purification efficiency. For example, impurities such as $O_2$ and $H_2O$ have a higher affinity for a zirconium alloy than impurities such as $N_2$ and $CH_4$. Therefore, when the activity of the sorbent starts to decrease, the impurities having a lower affinity towards the sorbent are the first to reach an unacceptable concentration in the gas after contacting the sorbent. For example, $N_2$ and $CH_4$ concentrations in the gas after purification thereof using a zirconium-based gettering alloy may increase, while other impurities, like $O_2$ and $H_2O$, may still be sorbed efficiently.

It should be understood that the "sorption propensity" or "affinity" of an impurity with regard to a sorbent may refer to the sorption equilibrium constant derived from the mass conservation law, and represents the affinity of the impurity for a sorption site of the sorbent. For example, if an impurity I binds to a sorption site S by the following adsorption reaction:

$$I + S \leftrightarrow Is$$

The adsorption equilibrium constant (equation 1) may represent the affinity of the impurity with regard to the sorbent:

$$K = \frac{[IS]}{[I][S]} \quad \text{(equation 1)}$$

Considering a first impurity $I_1$ having an affinity $K_1$ with regard to a sorbent and a second impurity $I_2$ having an affinity $K_2$ with regard to the sorbent, it is understood that $I_2$ may be considered to have a greater affinity to the sorbent than $I_1$ if $K_2 > K_1$. It is also understood that if the second impurity includes several impurities, each having an affinity $K_{2i}$ with regard to the sorbent, $K_2$ may be calculated as a global affinity constant taking into account the affinities $K_{2i}$ of each of the impurities, as would be known to a person skilled in the art.

Method Implementations

FIGS. 1 to 4B illustrate embodiments of methods according to the present description.

Method for Identifying Polluting Concentrations

In one aspect, there is provided a method for identifying polluting concentrations of impurities in the gas before purification of said gas by sorption on the sorbent. It should be understood that the term "polluting", when used in combination with "concentration" or "value", refers to a quantity of impurity that may somehow negatively affect the sorbent if the gas is contacted with the sorbent. The polluting concentration of an impurity depends for example on the respective nature of the impurity and the sorbent. The polluting concentration or value of each impurity contained in a gas would be known by a person skilled in the art, or determinable via routine experimentation.

Knowledge of the concentration of an impurity, especially of an impurity having a low sorption propensity for the sorbent, can be used for comparison with a known polluting concentration of the same impurity. In what follows, it should be understood that the "initial concentration" of an impurity corresponds to the concentration of this impurity in the gas before contacting the sorbent and before undergoing any pre-treatment. It should also be understood that the term "inlet concentration" of an impurity refers to the concentration of the impurity before contacting the sorbent, but may refer to the concentration of the impurity before undergoing a pre-treatment, during the pre-treatment or after the pre-treatment. In other words, the "inlet concentration" is a variable concentration which can have the value of the initial concentration before the gas undergoes a pre-treatment, and which can be lowered to a value lower than the initial concentration after the gas undergoes a pre-treatment.

In the embodiment illustrated in FIG. 1, there is provided a method for purifying a gas including an impurity. The method includes generating 10 an electrical discharge within the gas to obtain a spectral emission therefrom. The method also includes monitoring 12 the spectral emission, which is representative of a concentration of the impurity. One skilled in the art will readily understand that the generation of the electrical discharge to obtain the spectral emission, and the monitoring of the spectral emission may be performed simultaneously. The concentration of the impurity can be derived from the spectral emission, by analyzing the spectral emission. In some implementations, the method further includes comparing 14 the concentration of the impurity $C_i$ to a polluting concentration $C_p$, to determine if $C_i$ is below $C_p$. Depending on the value of the concentration $C_i$ with respect to the polluting concentration $C_p$ of the same impurity, the gas may be sent to contact the sorbent for purification 16, or sent to further processing before purification, as will be described in further details below. Optionally, the impurity to be monitored may have a low affinity for the sorbent. Further optionally, the impurity may include nitrogen, methane or a combination thereof.

It is understood that the expression "monitoring of a concentration", as used herein, refers to an indirect monitoring of a concentration by monitoring of a spectral emission which is representative of the concentration to be monitored, (the spectral emission being obtained by generating an electrical discharge within the gas), and analyzing the spectral emission in order to indirectly obtain a corresponding concentration value therefrom.

Figure 5:
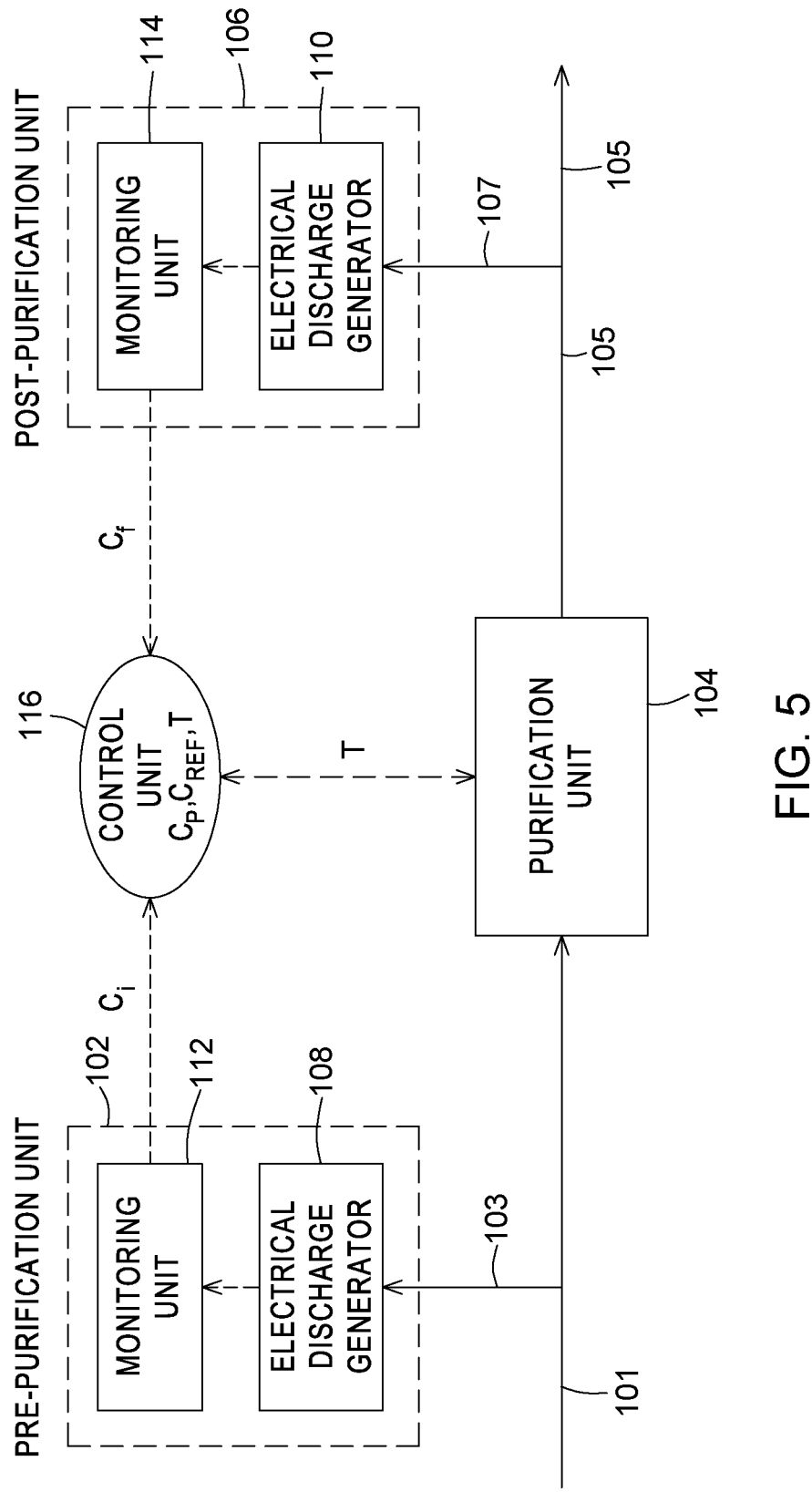
FIG. 5 is a schematic diagram of a gas purification system including a pre-purification system and a post-purification system, according to an embodiment.

It should be understood that the method for identifying polluting concentrations in the gas before purification by sorption may be performed on a sample of the gas instead on the whole quantity of gas to be purified as will be seen on FIG. 5. In this implementation, the method may therefore first include sampling a portion of the gas to produce a gas sample in which the electrical discharge will be subsequently created to generate the spectral emission therefrom.

Method for Pre-Treating a Gas to be Purified by Sorption

In another aspect, there is provided a method for pre-treating the gas before purification thereof on the sorbent. Such method may be used in order to prevent impurities having polluting concentrations from contacting the sorbent, or to reduce the concentration of impurities in the gas before the gas contacts the sorbent.

Figure 2:
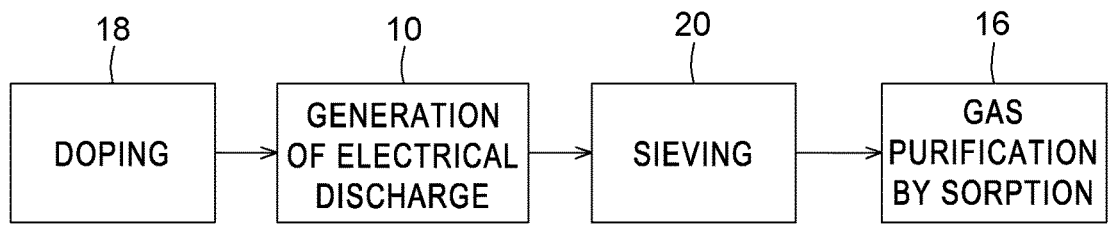
FIG. 2 is a schematic diagram of a gas purification method including pre-conversion of at least one impurity upstream of the gas purification, according to another embodiment.

Referring to FIG. 2, there is provided a method for purifying a gas including an impurity. The method includes generating 10 an electrical discharge within the gas before contacting 16 the gas with the sorbent. In some implementations, an impurity initially contained in the gas can be converted into at least one secondary impurity having a higher sorption propensity (or higher affinity) for the sorbent than the initial impurity. It should be understood that the secondary impurity refers to a component—or several components—derived from the initial impurity contained in the gas. In some implementations, the conversion of the impurity into the secondary impurity can be made according to physical and chemical reactions triggered by the electrical discharge within the gas. These physical and chemical reactions can involve various mechanisms such as electron transfer, electron impact, metastable action, photoionization, etc. It will be readily understood that the useful life of the sorbent may therefore be extended because all the processed impurities may be more easily sorbed by the sorbent.

For example, chemical reactions involving nitrogen and methane can be triggered by the electrical discharge according to the following equations:

$$N_2+O \rightarrow N+NO$$

$$N+O_2 \rightarrow NO+O$$

and $$CH_4+H_2O \rightarrow CO+3H_2$$

$$CO+H_2O \rightarrow CO_2+H_2$$

One skilled in the art will readily understand that the above equations are exemplary and that secondary impurities may be formed according to a plurality of other chemical reactions and other mechanisms as above mentioned.

In some implementations, the electrical discharge referred to herein includes at least one of a dielectric barrier discharge, a pulse discharge, a DC voltage discharge and a corona type discharge. One skilled in the art will readily understand that the electrical discharge is generated to ionize the gas and therefore create a corresponding artificial plasma medium or discharge. Atomic electrons become excited by collisions generated by the electrical field, bringing them to a higher energy state. When these electrons fall back to their original state, photons are emitted, resulting in a spectral emission from the gas. It is therefore understood that the expressions "plasma discharge" and "electrical discharge" may be interchangeably used herein.

Still referring to FIG. 2, in some implementations, the method may further include increasing a residence time during which the gas is submitted to the electrical discharge. Optionally, the residence time may be increased by controlling a gas pressure, for example between 30 psig and 150 psig, thereby decreasing a gas velocity during the generation of the electrical discharge 10. One skilled in the art will readily understand that various known means may be used to tailor the generation of the electrical discharge 10 such that specific reactions are triggered and specific secondary impurities are formed having higher sorption propensity for the sorbent. For example, photon-emission (UV) or metastable action may be used to trigger specific reactions involving the impurities.

In some implementations, the generation of the electrical discharge 10 may be multi-staged such that a same flow of gas may be submitted to several electrical discharges, before being sent to purification 16. It has been found that impurities may be more fully converted into secondary impurities by using a multi-staged technique.

Still referring to FIG. 2, the method may include adding 18 a doping agent to the gas, before submitting the gas to the electrical discharge in step 10. In some implementations, the doping agent may be moisture (in such case, the doping may be referred to as moisture doping). The moisture doping provides water molecules to the gas, and enables reactions between the water and the targeted impurities, such as nitrogen and/or methane. Optionally, the moisture level in the gas may be between 10 ppm and 200 ppm. It should be understood that the addition 18 of the doping agent may include adding a doping agent including at least one of $O_2$ and water.

It should be understood that the generation of the electrical discharge 10 may trigger conversion of at least a portion of the impurity into at least one secondary impurity. Optionally, all the impurities initially contained in the gas may be converted into more easily adsorbed secondary impurities.

In some implementations, the method may include monitoring the concentration of the impurity according to a spectral emission obtained during the generation of the electrical discharge 10, the spectral emission being representative of the concentration of the secondary impurities. Optionally, knowledge of the concentration of the secondary impurities may be used to evaluate the efficiency of the pre-treatment method.

Still referring to FIG. 2, the method may optionally include removing 20 the remaining doping agent from the gas before purification 16 by sorption. For example, in the case of moisture doping, the remaining moisture can be removed by molecular sieving 20, before purification 16 by sorption. In some implementations, a molecular sieve 13X may be used to that purpose. It is understood that other suitable materials may be used to trap the doping agent.

In some implementations, the method for pre-treating the gas may also include pre-reducing the level of impurities by contacting the gas with a preliminary sorbent (such as a preliminary gettering alloy), therefore extending the life of the main sorbent. In some implementations, the preliminary sorbent may be cheaper than the main sorbent. For example, a nickel-based alloy may be used to reduce the initial concentration of impurities including $O_2$, $H_2$, CO, $CO_2$ and NMHC before contacting the pre-treated gas with a main zirconium-based alloy.

Method for Characterizing Final Concentrations of Impurities in the Gas after Purification In another aspect, there is provided a method for characterizing final concentrations of impurities in the gas after purification of said gas by sorption on the sorbent. High sensitivity characterization of these final concentrations may be needed to detect pollution of the sorbent and avoid irreversible damages. The characterization method may therefore enable to detect deactivation of the sorbent at an early stage. The characterization method may be optionally performed on an in-line flow of purified gas or further optionally on a sample of the purified gas without departing from the scope of the present invention.

Figure 3:
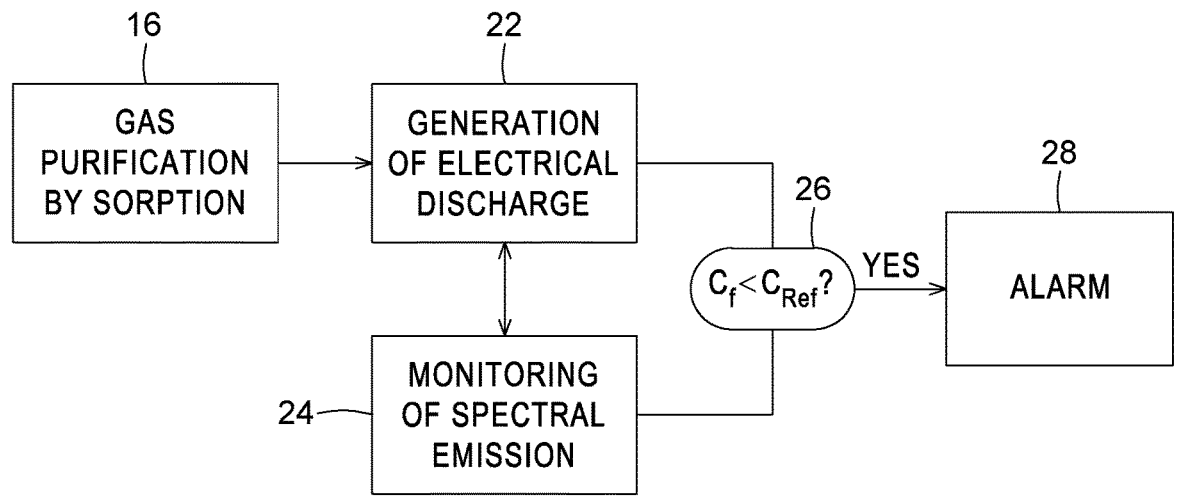
FIG. 3 is a schematic diagram of a gas purification method including post-detection of a final concentration of an impurity downstream of the gas purification, according to another embodiment.

Referring to FIG. 3, in some implementations, the method includes purification 16 of the gas on the sorbent to produce a purified gas, and further includes generating 22 an electrical discharge within the purified gas to obtain a spectral emission therefrom, the spectral emission being representative of the final concentration of the impurity in the purified gas. Optionally, the method may also include generating an electrical discharge within a reference sample of purified gas, thereby generating a reference spectral emission therefrom which is indicative of a reference concentration $C_{Ref}$ of at least one impurity in the reference sample. Alternatively, the reference spectral emission or the reference concentration may be given or known by one skilled in the art.

In some implementations, the method includes monitoring 24 of the spectral emission. Optionally, the generation 22 of the electrical discharge may be performed simultaneously to the monitoring 24 of the spectral emission. The monitored spectral emission is representative of a final concentration $C_f$ of the impurity in the purified gas, and the final concentration can be indirectly obtained by analyzing the spectral emission. It should be understood that the final concentration $C_f$ and/or the reference concentration $C_{Ref}$ may be null.

Still referring to FIG. 3, in some implementations, the method may further include comparing 26 the final concentration $C_f$ to the reference concentration $C_{Ref}$ for example so as to evaluate the efficiency of the purification. If the final concentration $C_f$ is above the reference concentration, it may indicate that the sorbent has started to be polluted, i.e. that there are fewer active sites available on the sorbent to trap the at least one impurity. Optionally, when the final concentration $C_f$ is above the reference concentration $C_{Ref}$ the method may include warning 28 a user that the sorbent does not operate as efficiently as it could be.

In some implementations, the method may also include comparing the final concentration $C_f$ to a maximum threshold, the maximum threshold being known and chosen to be indicative of a major pollution of the sorbent. Therefore, if the final concentration reaches the maximum threshold, the method may also optionally include warning a user that the sorbent is polluted and/or that an intervention is needed to avoid further damaging the sorbent or the downstream detectors and analytical systems.

One skilled in the art will readily understand that the monitoring of concentration of the impurity included in several embodiments of the methods described herein may include analyzing specific zones of the spectral emission, corresponding to wavelengths responsive to specific impurities or secondary impurities. For example, to achieve multiple-wavelength monitoring, different interference band pass optical filters can be used to filter out the required wavelengths.

Integrated Method

Figure 4A:
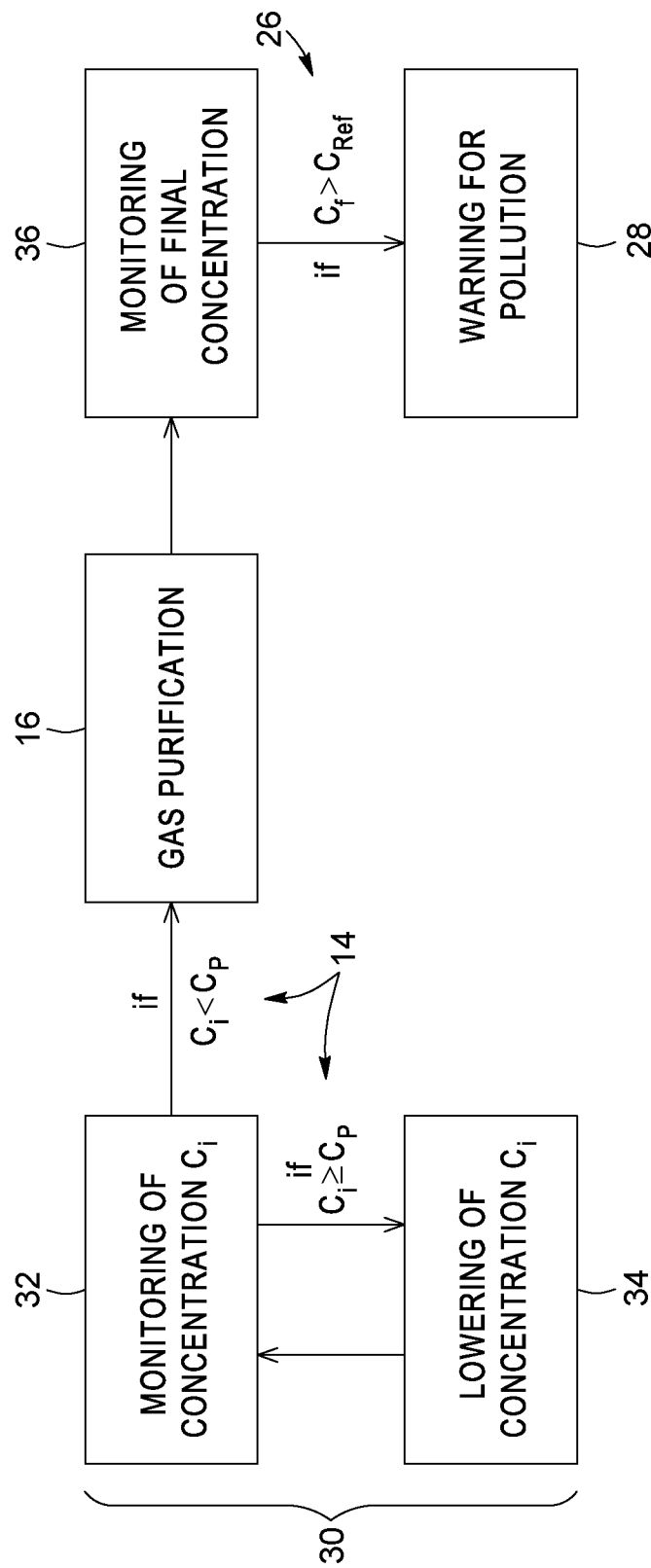
FIG. 4A is a schematic diagram of a gas purification method, according to another embodiment.
Figure 4B:
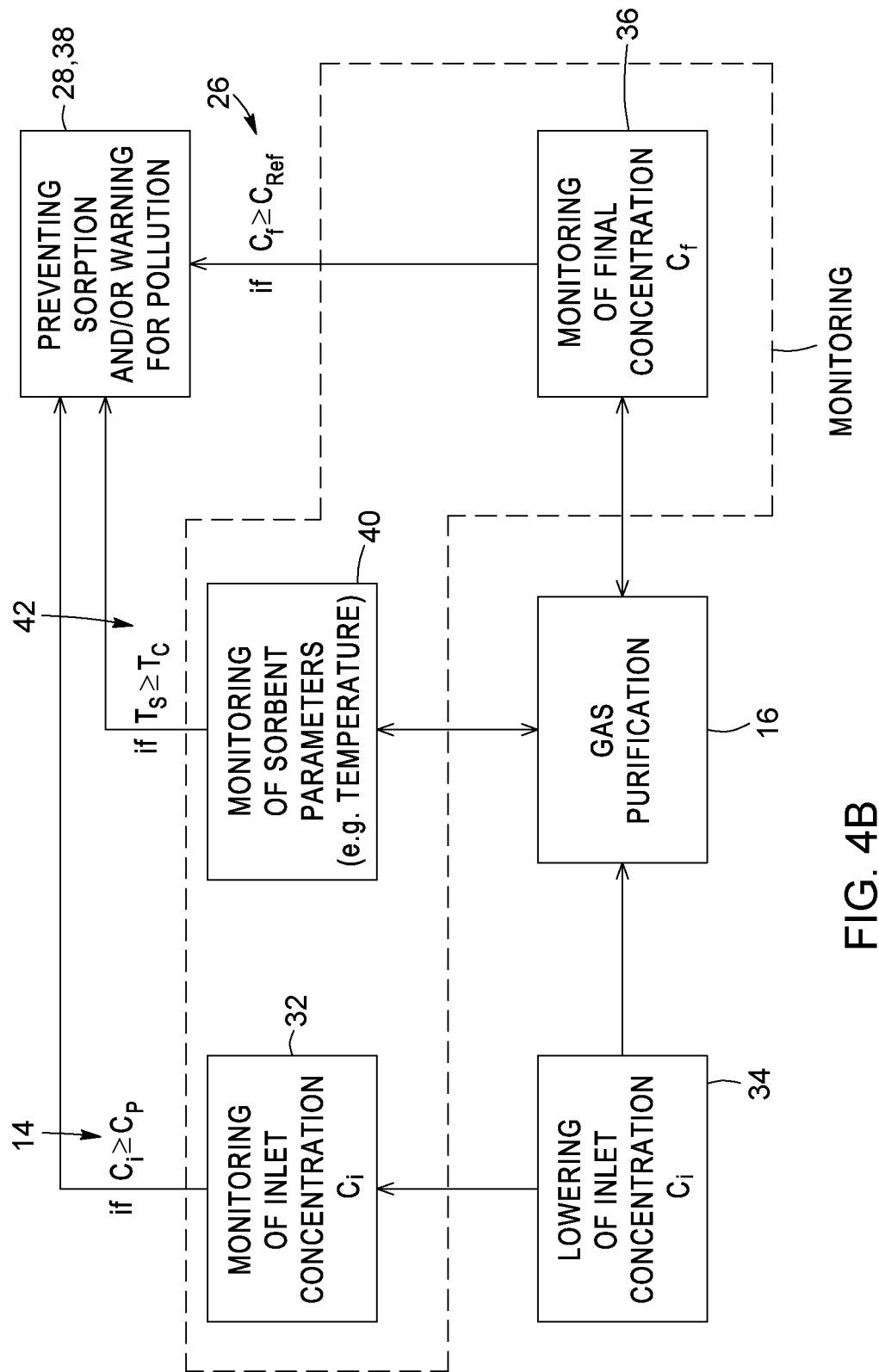
FIG. 4B is a schematic diagram of a gas purification method including a monitoring of several parameters, according to yet another embodiment.

Embodiments of the above-described methods may be combined into an integrated method for managing various concentrations of the impurities during the purification process as illustrated in FIGS. 4A and 4B.

Now referring to FIG. 4A, in some implementations, the spectral emission created from the gas before purification may be monitored to characterize the inlet concentration of the impurity and compare it to a known polluting concentration, in order to decide if the gas has to be further processed or treated before purification. Referring to FIG. 4A, the method includes a pre-purification step 30 in which the inlet concentration $C_i$ of the impurity is monitored 32 according to the steps 10 and 12 illustrated in FIG. 1 and as described above. As explained above, it will be readily understood that the monitoring 32 of the inlet concentration refers to an indirect monitoring of the inlet concentration. In some implementations, the monitored spectral emission may be analyzed to indirectly monitor the inlet concentration of several impurities such that the monitored spectral emission reflects the inlet quality of the gas to be purified.

Still referring to FIG. 4A, the method may include comparing 14 the monitored inlet concentration $C_i$ to the known polluting concentration $C_p$ so as to determine whether the composition of the gas can be damaging for the sorbent and/or downstream equipment. Based on this comparison 14, at least a portion of the impurity may be converted into a secondary impurity having a higher affinity for the sorbent, when the inlet concentration is equal or above the polluting concentration. This conversion step may be referred to as a lowering of the inlet concentration 34 of the impurity, the impurity having a lower affinity to the sorbent than the secondary impurity formed. Alternatively, based on the comparison 14, if the inlet concentration $C_i$ is below the polluting concentration $C_p$ of the impurity, the gas may be directly sent to purification by sorption 16. For example, if the monitored spectral emission is indicative of a high level (or polluting concentration) of air in a noble gas to be purified, the gas may be sent to further processing to reduce the air content, or the power supplied to the gettering alloy in order to reach a sorption temperature may simply be shut down.

As already mentioned above, the monitoring step 32 may be performed on a gas sample whereas the step of lowering the concentration $C_i$ 34 is preferably performed on the in-line flow of gas.

In some implementations, the monitoring 32 of the inlet concentration of the impurity and the lowering 34 of the inlet concentration may be performed simultaneously such that the monitored spectral emission reflects a decrease in the inlet concentration before purification of the gas 16.

Still referring to FIG. 4A, the method may include a post-purification step including monitoring 36 of the final concentration $C_f$ of the impurity. The knowledge of the final concentration may be used to evaluate the efficiency of the sorbent or detect the end of life of the sorbent. Again, the monitoring 36 of the final concentration of the at least one impurity refers to an indirect monitoring. The monitoring 36 may include the steps 22 and 24 as illustrated in FIG. 3 such that the monitored spectral emission from the purified gas is indicative of the final concentration $C_f$ of the at least one impurity. Then, based on the comparison 26 of the final concentration $C_f$ with respect to a known reference concentration $C_{Ref}$ or with respect to a known maximum threshold, the efficiency or the viability of the absorbent may be respectively appreciated. Optionally, the method may include warning 28 a user of a pollution degree of the sorbent such that he can proceed to the necessary steps to remediate to the pollution.

In some implementations, the method may include controlling (not illustrated in FIG. 4A) the gas purification depending on the monitored operating temperature, the monitored inlet concentration and the monitored final concentration. For example, the method may include converting the at least one impurity into a more easily sorbed secondary impurity when the operating temperature reaches a given maximum and even if the monitored inlet concentration of the at least one impurity is below the corresponding polluting concentration.

Now referring to FIG. 4B, in some implementations, a method for extending useful life of a sorbent is provided, the sorbent being for purifying a gas by sorption of an impurity. There is also provided a method for purifying a gas. It is understood that the expression "useful life" refers to the average amount of time for which the sorbent is expected to be useful, given certain operating conditions. It is therefore understood that the expression "extending useful life" refers to extending the average amount of time for which the sorbent is expected to be useful, given the same operating conditions. The method includes generating an electrical discharge within the gas to obtain a spectral emission which is representative of a concentration $C_i$ of the impurity, and monitoring 32 the concentration of the impurity $C_i$ according to the spectral emission (i.e., indirectly monitoring the concentration of the impurity, as explained above). In some implementations, the method also includes lowering 34 the concentration of the impurity $C_i$ by conversion of at least a portion of the impurity into a secondary impurity having a greater affinity to the sorbent than the impurity. In some implementations, the method further includes comparing 14 $C_i$ to a polluting concentration $C_p$, and directing the gas according to the comparison. In some implementations, when $C_i < C_p$: the gas is contacted with the sorbent for sorption of the impurity onto the sorbent 16, thereby obtaining a purified gas. In some implementations, when $C_i \geq C_p$: the gas is prevented 38 from being sorbed onto the sorbent and/or an alarm 28 is triggered to warn a user.

In some implementations, preventing 38 the sorption of the impurity onto the sorbent can include preventing the gas from contacting the sorbent and/or shutting down the power supplied to the sorbent. In some implementations, when $C_i \geq C_p$, the method includes further lowering the concentration of the impurity $C_i$.

In some implementations, the method may include monitoring 40 an operating temperature of the sorbent $T_s$ during purification 16. One skilled in the art will readily know that a sudden pollution of the sorbent can generate a lot of heat as violent exothermic reactions can be triggered. For example, detecting an increase in the operating temperature while there is no power supplied to heat the sorbent may be a sign that exothermic reactions are generated by impurity pollution. In some implementations, the method can include comparing 42 of the temperature of the sorbent $T_s$ to a critical temperature $T_c$. In some implementations, when $T_s<T_c$, the gas can be allowed to contact the sorbent for sorption of the impurity onto the sorbent. In some implementations, when $T_s \geq T_c$, the gas can be prevented 38 from contacting the sorbent and/or an alarm 28 can be triggered to warn a user and/or power to the sorbent can be shut down.

In some implementations, the method may include monitoring 40 a variation of the temperature of the sorbent as a function of the power sent to heat the sorbent. A reference temperature profile of the sorbent as a function of the power sent to heat the sorbent may be obtained and compared to readings of temperature variations. This can allow detecting abnormal behavior of the sorbent if the temperature variation does not correlate to the reference temperature profile. For example, monitoring an increase in the temperature of the sorbent while the power applied to heat the sorbent is set at 0% may be indicative of exothermic reactions taking place in the sorbent as a result of a polluting concentration of impurities, and may generally be indicative of an overload. In such case, an alarm may be generated to alert a user and/or the sorption of the gas onto the sorbent can be prevented. It is understood that the reference temperature profile can be different depending on the gas to be purified, on the impurities present in the gas and/or on the type of sorbent. In some implementations, the reference temperature profile can be obtained for given gas, sorbent and impurity under normalized operating conditions, and the monitoring of the temperature variation of the sorbent can be monitored so as to trigger an alarm if the temperature variation differs from the reference temperature profile by a certain amount, such as more than 10%, 20% or 30%. In some implementations, the temperature of the sorbent can be controlled by a proportional-integral-derivative controller (PID) which can calculate an error value and adjust the temperature accordingly by modifying the power sent to heat the sorbent.

In some implementations, the method further includes generating an electrical discharge within the purified gas to obtain a spectral emission representative of a final concentration of the impurity $C_f$ in the purified gas, and monitoring 36 the final concentration of the impurity according to the spectral emission. The method may also include comparing $C_f$ to a reference concentration $C_{Ref}$. In some implementations, when $C_f \geq C_{Ref}$ the sorption of the impurity onto the sorbent is prevented 38, and/or a warning signal 28 is sent to a user.

Purification System Implementations

Figure 6:
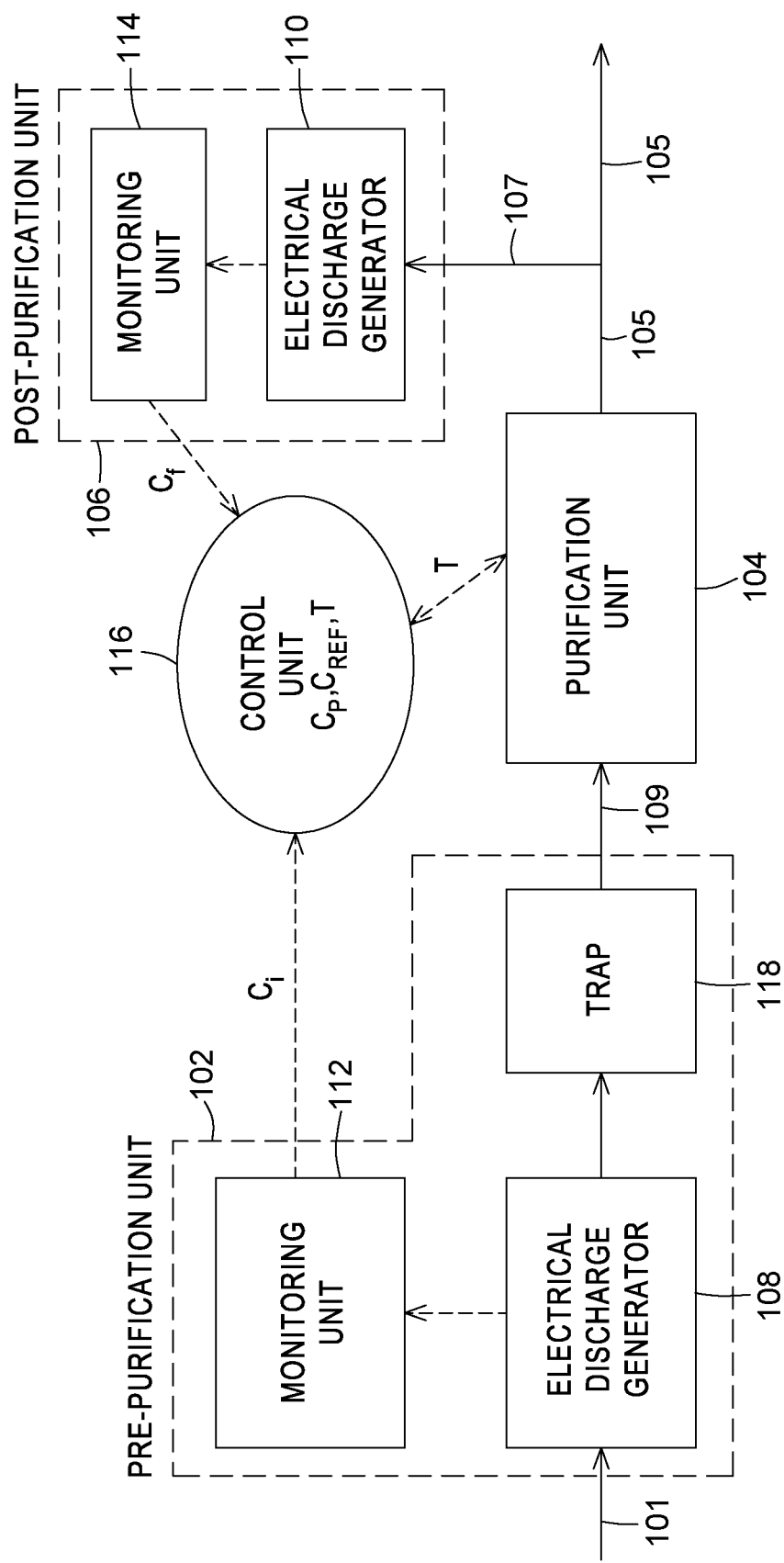
FIG. 6 is a schematic diagram of a gas purification system including an pre-purification system including an in-line electrical discharge reactor, and a bypass post-purification system, according to another embodiment.
Figure 7:
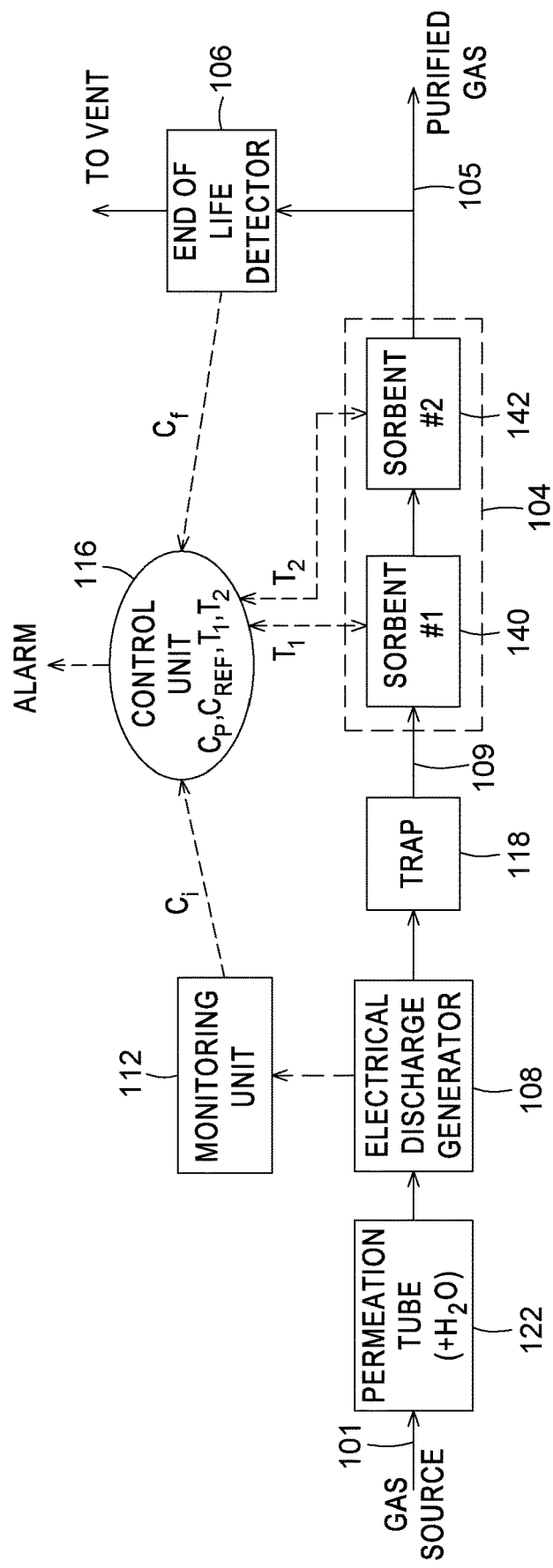
FIG. 7 is a schematic diagram of a gas purification system including an in-line electrical discharge reactor, a monitoring unit and a control unit, according to another embodiment.
Figure 8:
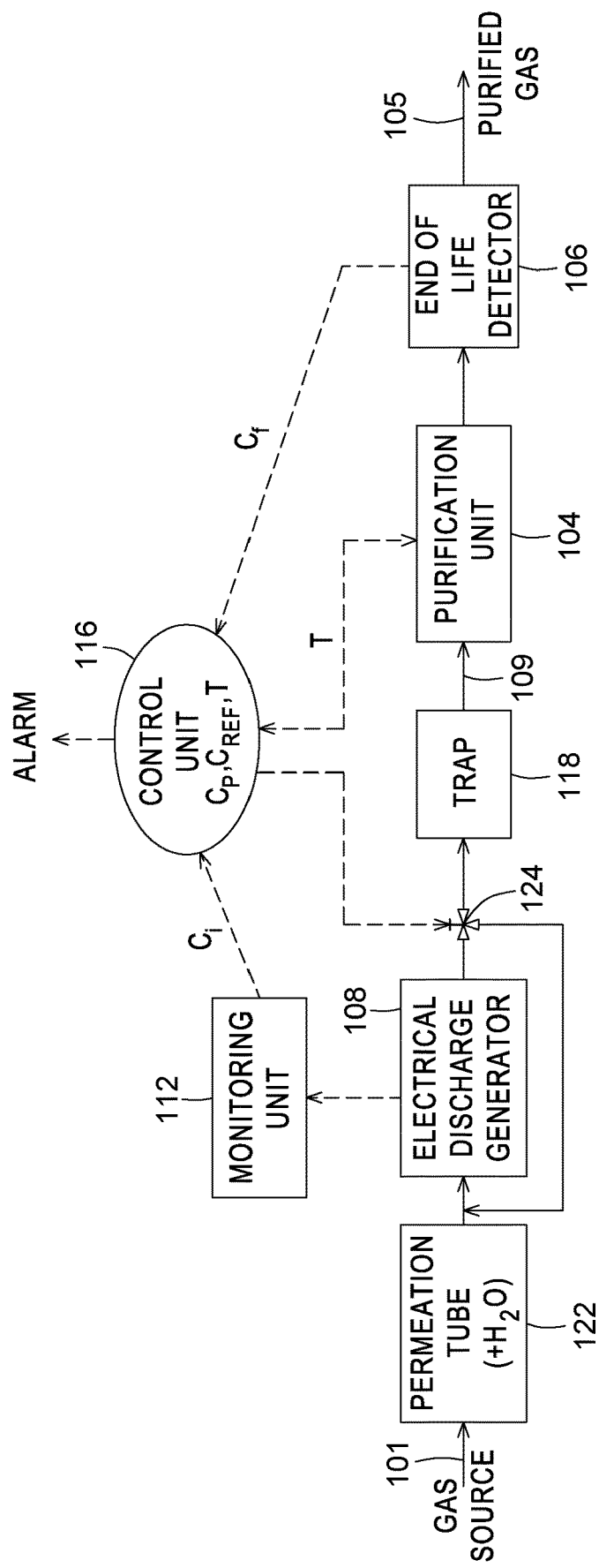
FIG. 8 is a schematic diagram of a gas purification system including a flow control device between the in-line electrical discharge reactor and the purification unit, according to yet another embodiment.

FIGS. 5 to 8 illustrate embodiments of purification systems which are configured to perform implementations of the above-described methods. FIGS. 7 and 8 illustrates in more details the various units and devices that may be included in the purification system of FIG. 6.

Now referring to FIG. 5, in some implementations, a purification system including a pre-purification unit 102 and a post-purification unit 106 installed in parallel of a purification unit 104 is provided. An inlet flow of gas to be purified 101, such as a contaminated noble gas, is provided to the purification unit 106 so as to produce an outlet purified flow of gas 105. An inlet sample 103 of the flow of gas to be purified 101 is fed to the pre-purification unit 102. An outlet sample 107 of the purified flow of gas 105 is fed to the post-purification unit 106.

Now referring to FIG. 6, in some implementations, a purification system including the pre-purification unit 102 installed in line of the purification unit 104 is provided. The inlet flow of gas to be purified 101 is directly sent to the pre-purification unit 102 to produce a pre-treated flow of gas 109 which is fed to the purification unit 104.

Referring to FIGS. 5 and 6, both pre-purification unit 102 and post-purification unit 106 include an electrical discharge generator 108, 110 generating an electrical discharge within the gas sample or the in-line flow of gas. It should be noted that the discharge generator 108, 110 may be used as a reactor or a detector depending on the purpose of the generation of the discharge. For example, when a discharge is generated for triggering reactions among the impurities for conversion into secondary impurities before purification, the discharge generator may be qualified of reactor. Alternatively, when a discharge is generated for monitoring spectral emission from the gas and detect specific concentrations, the discharge generator may be qualified of detector. It should further be understood that the discharge referred to herein includes a plasma discharge or an electrical discharge. The discharge reactor/detector may therefore be for example a plasma emission detector or an electrical discharge reactor. It is also understood that the in-line electrical discharge generator 108 (such as the one shown in FIG. 6) may be used as a reactor and a detector simultaneously. In some implementations, when the electrical discharge generator is used as a reactor, a reaction chamber is provided therein. The reactions for converting the impurity into secondary impurities can take place in the reaction chamber, and can be triggered by the electrical discharge.

In some implementations, the discharge reactor/detector and the monitoring unit may be as described in U.S. provisional patent applications Nos. 62/129,231 and 62/129,578, which are hereby incorporated by reference in their entirety. In some embodiments, the monitoring unit 112, 114 for monitoring the spectral emission can monitor a luminous discharge from the gas. In some implementations, the monitoring device includes a Plasma Emission Detector (PED). In devices of this type, the gas to be analysed is fed into a plasma chamber, where it undergoes a transformation under an applied excitation field. Chemical compounds are ionised and decomposed by collisions with energetic electrons and molecules and atomic components are excited to higher energy levels, emitting radiation in the de-excitation process characteristic of the spectral properties of the species present in the gas. Processing this radiation can therefore provide information related to the nature and relative concentration of the species in the gas to be analysed.

In some implementations, by tuning the monitoring unit to a wavelength known to characterize the impurity, the monitored spectroscopic emission can be representative of the presence of the impurity, and contain no or minimal contributions from the gas to be purified. Detection of the light from the monitored spectral emission provides a spectral emission signal which can be continuously monitored over time, and can therefore allow following the variation of the concentration of the impurity in the gas, as the concentration of the impurity is being gradually lowered by conversion to a secondary impurity. Consequently, the monitored intensity of the spectral emission signal is originally proportional to the concentration of the impurity in the reaction chamber. As the conversion of the impurity to the secondary impurity continues, the monitored intensity of the spectroscopic emission signal decreases as there is less and less impurity in the gas.

In some implementations, the monitoring device can include a light detector such as a photodiode or the like, transforming the light emitted by the plasma into a proportional analog or digital signal embodying the spectral emission signal. In one variant, the light detector may be mounted at one or more windows of the plasma chamber so as receive the light from the plasma directly. In another variant, the light from the plasma may be collected into an optical fiber guiding this light for detection away from the plasma chamber.

In some implementations, detection of the light from the plasma may be wavelength-specific, so that the spectroscopic emission signal monitored through the methods of the present description includes only the light at the wavelength of wavelengths representative of the impurity or impurities to be monitored. Wavelength specificity may be achieved in a variety of manners. In one example, a filter or filters may be provided in a path of the light from the plasma such that only light having the desired spectral contents reaches the photodiode. In other variants different configurations could be used to extract the spectral information from the detected signals, such as for example using a spectrometer or other spectrally resolved detector to convert the optical energy into analog or digital information.

In some implementations, depending on the quantity of gas to be processed (e.g. sample vs in-line flow), the size of the discharge reactor/detector may vary.

In other implementations, the electrical discharge reactor may include several discharge zones or chambers to perform multi-staged reactions within the in-line flow of gas.

Still referring to FIGS. 5 and 6, in some implementations, the pre-purification 102 unit includes a monitoring system 112 which is configured to monitor the spectral emission created by the electrical discharge within the gas to be purified 101 and which is indicative of the inlet concentration of the impurities and/or secondary impurities. The post-purification unit 106 includes a detection system 114 configured to detect abnormal behavior of the absorbent in the purification unit 104. One skilled in the art will readily understand that the monitoring system 112 and the detection system 114 may include similar devices as both monitoring system 112 and detection system 114 have to monitor a spectral emission from the sample gas or in-line flow of gas which is indicative of the inlet concentration and the final concentration of the impurities respectively. In some implementations, the detection system 114 and the discharge generator 110 may be integrated in a single device referred to as an end of life detector 106 as seen in FIG. 7.

Referring to FIGS. 5 to 8, the systems shown include a controller 116 which may be configured to analyze the monitored spectral emission from the inlet flow/sample of gas and the outlet sample of gas for identification of the inlet concentrations and final concentrations of targeted impurities.

In some implementations, the controller 116 may be further configured to compare a monitored spectral emission profile to a known reference spectral emission profile. In other implementations, the controller 116 may be configured to compare the inlet/final concentrations to known values including a reference concentration and a polluting concentration as defined above.

In some implementations, the controller 116 may also be configured to receive information regarding the operating temperature inside the purification unit 104 or purifier modules 140, 142.

In some implementations, the controller 116 may be configured to change operating conditions of the discharge reactor 108 of the pre-purification unit 102 and of the purification unit 104 according to the information regarding the operating temperature, inlet concentrations and final concentrations.

In other implementations, the controller 116 may be configured to shut down the purification unit and/or to prevent contact of the gas with the sorbent when at least one of the following conditions are met: the operating temperature reaches a critical temperature, the inlet concentration of the impurity reaches a polluting concentration, and the final concentration of the impurity reaches a maximum threshold (or a reference concentration). It should also be noted that baseline shift or drift, ghost peaks and negative peaks in the monitored spectral emissions may considered as signs of abnormal behavior of the purification unit 104.

Referring to FIG. 7, in some implementations, the purification unit 104 may include a first purification module 140 in fluid communication with a second purifier module 142. The first purification module 140 may be powered such that the gettering alloy reaches a first temperature of 450° C., corresponding to the sorption temperature of impurities including nitrogen and methane. However, this temperature is considered as a high temperature triggering various reactions releasing $H_2$. The second purification module 142 may be powered such that the gettering alloy therein reaches a second temperature of 180° C., corresponding to the sorption temperature of impurities including $H_2$. More generally, the purification unit may include a first gettering alloy heated at a first temperature $T_1$, and a second gettering alloy heated at a second temperature $T_2$. The first and second sorbents may each have a critical temperature $T_{c1}$ and $T_{c2}$. In some implementations, $T_1 > T_2$, such that $T_1$ is a suitable temperature for sorbing impurities on the first gettering alloy. By-products of the first sorbing step (e.g. release of $H_2$) may then be sorbed onto the second gettering alloy at a lower temperature suitable for sorbing the by-products. It is understood that the controller 116 may be configured to monitor both temperatures $T_1$ and $T_2$. In some implementations, when $T_1 < T_{c1}$, the gas can be allowed to contact the first sorbent for sorption of the impurity onto the first sorbent. In some implementations, when $T_2 < T_{c2}$, the gas can be allowed to contact the second sorbent for sorption of the impurity onto the second sorbent. If the monitored temperature of any of the two sorbents exceeds the respective critical temperature, sorption can be prevented and/or an alarm signal can be sent to a user.

Still referring to FIG. 7, in some implementations, the moisture doping may be performed by passing the gas to be purified 101 through a doping agent dispenser 122 (e.g. a permeation tube, a membrane or a similar device). The moisture remaining in the gas after pre-treatment in the electrical discharge reactor 108 may be trapped by the downstream trapping material 118 before purification. The trapping material 118 may be a tube filled with a molecular sieve 13X, the tube being installed at an outlet of the discharge reactor 108. It should be noted that the trapping material 118 illustrated in FIG. 6 may be any trapping material enabling to at least reduce the inlet concentration of various impurities or secondary impurities before purification. For example, the trapping material 118 may be a nickel-based catalyst.

Now referring to FIG. 8, in some implementations, a flow control device 124 is provided upstream of the purification unit 104. The flow control device 124 may be operatively connected to the control unit 116, such that the control unit 116 can either direct the flow control device 124 to enable fluid communication between the electrical discharge reactor 108 and the purification unit 104, or direct the flow control device to prevent fluid communication between the electrical discharge generator 108 and the purification unit 104. In some implementations, the flow control device 124 is a 3-way valve. The flow control device can for example be placed between the electrical discharge generator 108 and the trapping material 118 as shown in FIG. 8, between the trapping material 118 and the purification unit 104 (not shown in FIG. 8), or directly between the plasma discharge generator and the purification unit 104 is no trapping material 118 is present. In some implementations, the flow control device 124 can be configured to reroute the gas upstream of the plasma discharge generator 108 or upstream of the doping agent dispenser 122, when fluid communication between the electrical discharge generator 108 and the purification unit 104 is prevented.

In some implementations, the controller 116 may include a proportional-integral-derivative controller (PID) for controlling the temperature of the sorbent and/or the concentration of impurity. For example, the temperature of the sorbent can be controlled as described above, and the concentration of impurity can be controlled by modifying the residence time in the electrical discharge reactor 108 or actuating a flow control device 124 to loop back the gas to the electrical discharge reactor 108.

In some implementations, the spectral emission generated from the purified gas at the beginning of the life of the sorbent may be monitored and recorded as the reference spectral emission profile including emission wavelengths intensity and baseline level values.

One skilled in the art will readily understand that spectral emission profile may vary according to the gas pressure. To avoid any variation of the profile based on the pressure, systems of the present invention may include a pressure transducer to ensure that the pressure during generation of the electrical discharge is the same as the operating pressure in the purification unit. Alternatively, the methods of the present invention may include compensating the baseline shifting of the monitored spectral emission in relation to pressure change so as to compensate the spectral emission intensity accordingly.

It should be understood that the implementations of the present systems and methods enable to obtain a steady and secure purification process with reduction of the impurities concentration down a ppb level, while extending the lifetime of the sorbent.

The invention claimed is:

1. A method for extending useful life of a sorbent, the sorbent being for purifying a gas by sorption of an impurity, the method comprising:
generating an electrical discharge within the gas to obtain a spectral emission representative of a concentration of the impurity $C_i$ in the gas;
gradually lowering the concentration of the impurity $C_i$ in the gas by conversion to a secondary impurity having a greater affinity to the sorbent than the impurity, to obtain a pre-treated gas,
determining the concentration of the impurity $C_i$ according to the spectral emission as the concentration of the impurity is being gradually lowered;
determining the difference between the concentration of impurity $C_i$ and a known polluting concentration $C_p$, of the impurity with respect to the sorbent, the polluting concentration $C_p$ being a concentration above which the sorbent is damaged by the impurity, and allowing sorption of the impurity onto the sorbent when $C_i < C_p$, by contacting the pre-treated gas with the sorbent, to obtain a purified gas; or
preventing the sorption of the impurity onto the sorbent when $C_i \geq C_p$, by preventing the gas from contacting the sorbent, further lowering the concentration of the impurity Ci in the gas, and allowing sorption of the impurity onto the sorbent when $C_i < C_p$, thereby extending the useful life of the sorbent.

2. The method of claim 1, wherein:
allowing the sorption of the impurity onto the sorbent comprises powering-up a purification unit for contacting the pre-treated gas with the sorbent; and
preventing the sorption of the impurity onto the sorbent comprises shutting down power supplied to the purification unit.

3. The method of claim 1, further comprising adding a doping agent to the gas, the conversion of the impurity being performed by a reaction of the impurity with the doping agent, the reaction being triggered by the electrical discharge.

4. The method of claim 3, wherein the doping agent comprises at least one of water and $O_2$.

5. The method of claim 3, wherein the doping agent comprises water.

6. The method of claim 3, wherein the doping agent is added at a concentration between 10 ppm and 200 ppm.

7. The method of claim 3, further comprising removing the doping agent from the gas prior to contacting the gas with the sorbent.

8. The method of claim 1, further comprising:
monitoring a temperature of the sorbent $T_s$;
comparing $T_s$ to a critical temperature $T_c$, and preventing the sorption of the impurity onto the sorbent when $T_s \geq T_c$.

9. The method of claim 1, further comprising:
generating an electrical discharge within the purified gas to obtain a second spectral emission representative of a residual concentration of the impurity $C_f$ in the purified gas;
monitoring the residual concentration of the impurity $C_f$ according to the second spectral emission; and
comparing $C_f$ to a reference concentration $C_{Ref}$ and preventing the sorption of the impurity onto the sorbent and/or sending a warning signal to a user when $C_f \geq C_{Ref}$.

10. The method of claim 1, wherein the gas comprises a noble gas.

11. The method of claim 10, wherein the noble gas comprises helium, argon, neon, krypton, xenon or a mixture thereof.

12. The method of claim 1, wherein the sorbent comprises at least one of a gettering alloy, a molecular sieve, a catalytic sorbent and activated carbon.

13. The method of claim 1, wherein the sorbent comprises a gettering alloy.

14. The method of claim 12, wherein the gettering alloy is zirconium-based.

15. The method of claim 1, wherein the impurity comprises at least one of $H_2O$, $N_2$, $CH_4$, $CO$, $CO_2$, $H_2$ and a non-methane hydrocarbon (NHMC).

16. The method of claim 1, wherein the electrical discharge comprises at least one of a dielectric barrier discharge, a pulse discharge, a DC voltage discharge and a corona type discharge.

17. The method of claim 1, wherein the electrical discharge is multi-staged.

* * * * *